United States Patent [19]
Dykema

[11] Patent Number: 5,940,000
[45] Date of Patent: Aug. 17, 1999

[54] TRAINABLE TRANSMITTER SECURITY CIRCUIT

[75] Inventor: Kurt A. Dykema, Holland, Mich.

[73] Assignee: Prince Corporation, Holland, Mich.

[21] Appl. No.: 08/895,754

[22] Filed: Jul. 17, 1997

[51] Int. Cl.$^6$ .................................................. G08B 25/00
[52] U.S. Cl. ................................ 340/825.22; 340/825.69; 340/825.72
[58] Field of Search .................. 340/825.22, 825.69, 340/825.72, 825.31; 341/176; 348/734

[56] References Cited

U.S. PATENT DOCUMENTS

| | | | |
|---|---|---|---|
| 4,598,287 | 7/1986 | Osakabe et al. | 340/825.24 |
| 5,583,485 | 12/1996 | Van Lente et al. | 340/525 |
| 5,686,903 | 11/1997 | Duckworth et al. | 340/825.22 |

*Primary Examiner*—William A. Cuchlinski, Jr.
*Assistant Examiner*—Yonel Beaulieu
*Attorney, Agent, or Firm*—Price, Heneveld, Cooper, DeWitt & Litton

[57] ABSTRACT

A latching circuit is coupled to the vehicle's power supply and to a trainable transmitter microprocessor such that upon initial training, the latch is set to maintain a logic level signal to the microprocessor for enabling the microprocessor once initially trained. If, however, the power is removed from the latch circuit and reapplied, as may occur if the trainable transmitter is removed from the vehicle, the latch circuit will provide a different logic level signal to the microprocessor either disabling the transmit function for the microprocessor or erasing the code stored in the nonvolatile memory. The trainable transmitter, thus, will not be useful unless retrained utilizing the homeowner's original transmitter. The invention, the latch circuit includes a pair of MOSFETs with a very low current drain coupled in a flip-flop configuration such that their operational state will reverse once set upon removal and reapplication of power.

22 Claims, 1 Drawing Sheet

5,940,000

1
TRAINABLE TRANSMITTER SECURITY CIRCUIT

BACKGROUND OF THE INVENTION

The present invention relates to an electrical circuit preventing the use of a trainable transmitter if removed from a vehicle.

Trainable transmitters for use in garage door opening applications have become an extremely popular accessory inasmuch as they allow the vehicle owner to eliminate the annoying clip-on transmitter which frequently is sold with a garage door opening system. Further, they are popular inasmuch as they allow reprogramming with vehicle changes, home changes and, therefore, provide the vehicle owner with a garage door opener installed in a vehicle which will adapt to an existing garage door opening receiver. Such remote controls are also employed for security gates and can be employed with home security systems as well. U.S. Pat. No. 5,583,485 discloses such a trainable garage door opening transmitter.

A potential problem exists in that if a vehicle having a transmitter trained to one's security gate, garage door opener or home security system is stolen by, for example, removing a visor into which the garage opening transmitter is installed, the thief potentially could apply power to the visor and utilize the same for gaining unauthorized access. The use of rolling code algorithms by which every actuation of the garage door opening transmitter incrementally changes the code transmitted which is recognized by a synchronized receiver tends to reduce the possibility that such a theft could result in the subsequent successful use of a stolen programmable transmitter. Nonetheless, the potential still remains. A programmable transmitter which utilizes a programmable rolling code is disclosed in U.S. patent application Ser. No. 08/495,101, filed Jun. 27, 1995, and entitled TRAINABLE TRANSMITTER CAPABLE OF LEARNING VARIABLE CODES.

SUMMARY OF THE PRESENT INVENTION

The electrical circuit of the present invention overcomes the potential for theft of a trainable transmitter by providing a latch circuit which, if the remote control transmitter is removed from power, will disable the transmitter if power is subsequently applied. It accomplishes this goal through a latching circuit coupled to the microprocessor associated with the transmitter such that if power is disconnected by theft of the transmitter, the transmitter must be retrained with the original transmitter in the control of the homeowner, thus making it impossible for a stolen programmable transmitter to be employed for opening the homeowner's security gate, garage door or deactivating a home security system.

An electrical circuit of the present invention accomplishes this goal by providing a latching circuit coupled to the vehicle's power supply and coupled to the transmitter microprocessor such that upon initial training, the latch is set to maintain a logic level signal to the microprocessor for enabling the microprocessor once initially trained. If, however, power is removed from the latch circuit and reapplied, as may occur if the trainable transmitter is removed from the vehicle, the latch circuit will provide a different logic level signal to the microprocessor either disabling the transmit function for the microprocessor or erasing the code stored in the non-volatile memory. The trainable transmitter, thus, will not be useful unless retrained utilizing the homeowner's original transmitter. In a preferred embodiment of the invention, the latch circuit includes a pair of MOSFETs with a very low current drain coupled in a flip-flop configuration such that once set their operational state will reverse upon removal and reapplication of power.

These and other features, objects and advantages of the present invention will become apparent upon reading the following description thereof together with reference to the accompanying drawing.

DETAILED DESCRIPTION OF THE PREFERRED EMBODIMENT

Figure 1:
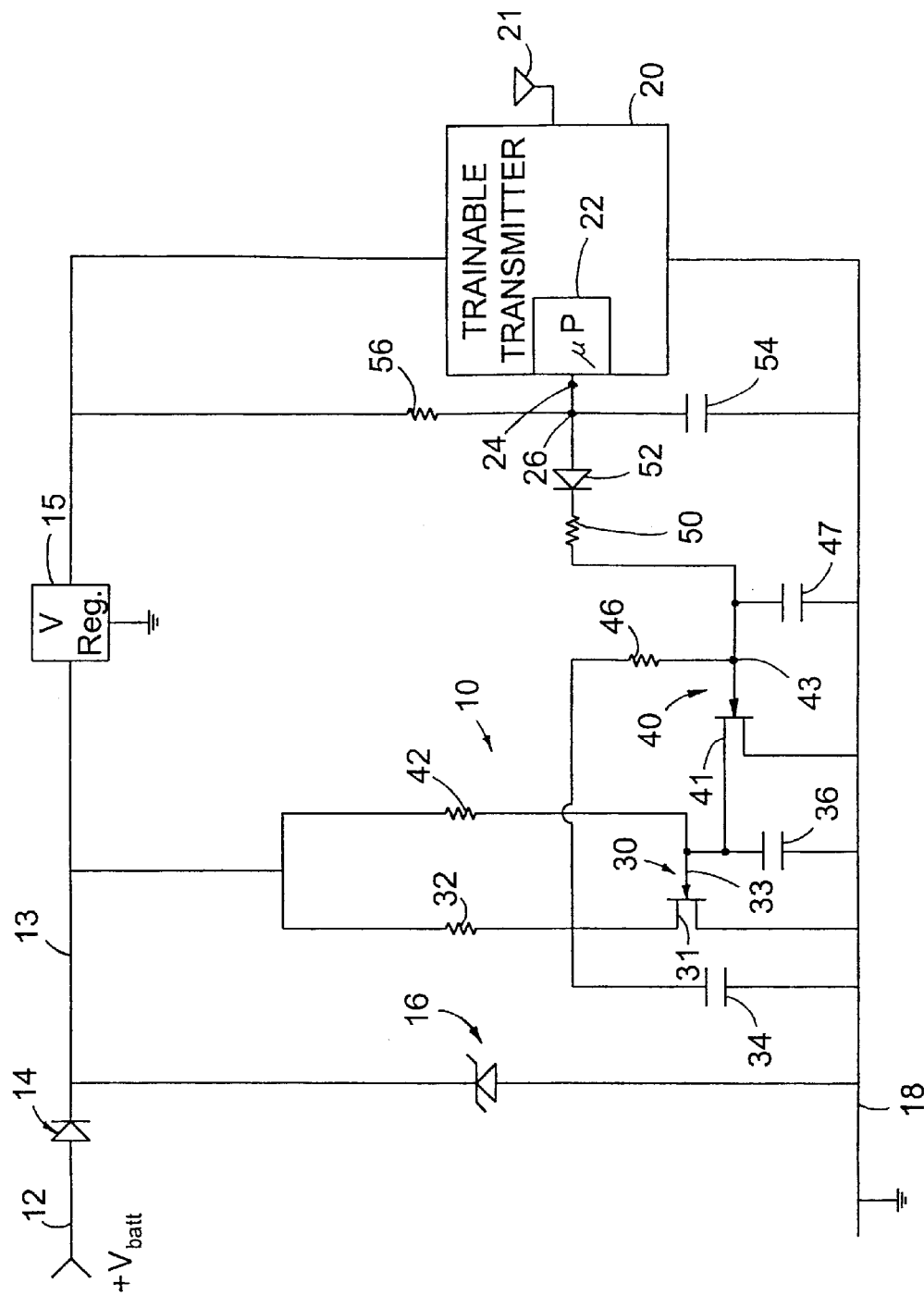
FIG. 1 is an electrical circuit diagram in block and schematic form of the security circuit of the present invention.

Referring to FIG. 1, there is shown an anti-theft security circuit 10 embodying the present invention which is coupled to the battery supply line 12 of a vehicle through a reverse battery protection diode 14. A clamping zener diode 16 is coupled from the cathode of diode 14 to a ground conductor 18 to prevent transient voltages from being applied to circuit 10. Thus, circuit 10 is coupled between a protected power supply conductor 13 and ground 18.

Supply conductor 13 is coupled to a voltage regulator circuit 15 for supplying a regulated 5 volts to the trainable transmitter 20 shown in block form in FIG. 1. Transmitter 20 includes a microprocessor 22 having an input/output port 24 which is coupled to an input/output or control terminal 26 of circuit 10. The transmitter 20 is more fully disclosed in U.S. Pat. No. 5,583,485, the disclosure of which is incorporated herein by reference. For purposes of the present invention, it is only necessary to appreciate that the microprocessor 22 associated with the programmable transmitter includes an input/output port 24 which is periodically sampled to determine its logic level state and upon initial programming provides a logic 1 level output at the port 24 which is applied to the terminal 26 of circuit 10 now described.

Circuit 10 comprises a pair of FETs and preferably MOSFETs 30 and 40 with MOSFET 30 having a drain coupled to supply line 13 through a 1 mega ohm resistor 32 and its source coupled to ground 18. A 100 nano farad capacitor 34 is coupled from the drain 31 of MOSFET 30 to ground. The gate 33 of MOSFET 30 is coupled to a 1000 pico farad capacitor 36 and to the drain 41 of a second MOSFET 40 having its source coupled to ground conductor 18. Drain 41 is also coupled to supply line 13 by a 1 mega ohm resistor 42. The gate 43 of MOSFET 40 is coupled to the drain 31 of MOSFET 30 through a 100 K ohm resistor 46. Gate 43 is also coupled to a 1 nano farad capacitor 47 for providing transient protection. Gate 43 of MOSFET 40 is also coupled to the input/output terminal 26 of the security circuit 10 by means of a serially coupled 1 K ohm resistor 50 and a diode 52 having its cathode coupled to resistor 50 and its anode coupled to terminal 26. Coupled to terminal 26 of circuit 10 also is a 0.01 micro farad capacitor 54 coupled between terminal 26 and ground. A 1 mega ohm resistor 56 is coupled from terminal 26 to the regulated 5 volt supply line such that during normal operation, when the security circuit 10 is latched, terminal 26 will be held at approximately 5 volts with MOSFET 40 conductive. Having briefly described the circuit components and their interconnection, a description of the circuit operation follows.

Upon initial activation of power to the circuit prior to the training of the programmable transmitter 20, the time constants selected by the values of capacitors 34, 36 are such that, when voltage is applied on conductor 13, gate 33 will become positive prior to gate 43, thereby rendering MOSFET 30 conductive. This pulls down the voltage on gate 43 of MOSFET 40, rendering it nonconductive. With gate 43 being effectively at ground through the conductive MOSFET 30, terminal 26 will be pulled down to a logic low level presenting at input terminal 24 to the microprocessor a logic "0", which is recognized by the software of the microprocessor preventing activation of the transmitter. This can be accomplished by either disabling the transmit function or by erasing any stored code in memory.

When the vehicle owner initially trains the transmitter 20, the activation of the training switch together with the receipt of a signal from the programming transmitter causes the microprocessor 22 to provide a logic "1" or 5 volt level signal at input/output terminal 24, which signal is applied to gate terminal 43 of MOSFET 40 through diode 52 and resistor 50, thereby driving MOSFET 40 into conduction. With MOSFET 40 in conduction, its drain 41 is pulled down to near ground potential which pulls down gate 33 of MOSFET 30, thereby rendering MOSFET 30 nonconductive. In this state, the latch is "set" and input terminal 24 of the microprocessor remains at a logic "1" or 5 volt level since MOSFET 30 is turned off and its drain 31 is thereby allowed to raise to a higher voltage level. As long as power is continuously applied to the supply line 13, this quiescent state of circuit 10 remains and the programmable transmitter 20 functions to transmit through its antenna 21 the stored memorized frequency and code of the homeowners security gate, garage door opener or home security system.

In the event, however, that the trainable transmitter 20, which may be mounted in a visor, console or other vehicle housing, is stolen from the vehicle and power is disconnected, upon reapplication of power, the RC time constant for gate 33 of MOSFET 30 is such that again MOSFET 30 will be rendered conductive pulling down the gate 43 of MOSFET 40 and providing a logic "0" level at terminal 26 which is coupled to input terminal 24 of microprocessor 22, thereby rendering the transmitter inoperable until such time as the training sequence has been reinstituted.

This allows the homeowner/vehicle owner to reprogram the system, in the event the battery is disconnected for any reason, utilizing the original transmitter for such purpose. On the other hand, a thief who has removed the trainable transmitter from the vehicle does not have access to the original transmitter and, therefore, cannot program the transmitter to the vehicle owner's receiver.

By utilization of low current MOSFETs and relatively high value resistors 32, 42, circuit 10 requires very little current to remain in its latched or set condition providing a logic level "1" at terminal 26 thereof. It will become apparent to those skilled in the art that various modifications to the preferred embodiment of the invention as described herein can be made. Such modifications could include the integration of the circuit 10 with the application specific integrated circuit of a trainable transmitter 20. These and other modifications to the preferred embodiment will become apparent to those skilled in the art but will fall within the spirit or scope of the invention as defined by the appended claims.

The embodiments of the invention in which an exclusive property or privilege is claimed are defined as follows:

1. A trainable transmitter including said security latch circuit comprising:
   a source of operating power;
   a trainable transmitter having an input/output terminal, said trainable transmitter coupled to said source; and
   a latch circuit coupled to said source of power and having a control terminal coupled to said input/output terminal of said trainable transmitter, said circuit latched in a first state when power is first applied to said circuit, said circuit providing a first logic level signal at said control terminal when in said first state, said circuit responsive to a signal applied to said control terminal from said input/output terminal of said trainable transmitter when trained to reverse the state of said latch in response to said signal at said control terminal to provide a different logic level signal at said control terminal as long as power is continuously applied to said latch, said trainable transmitter responsive to signals at said control terminal to be operative only when said different logic level signal is present.

2. The circuit as defined in claim 1 wherein said latch circuit includes a pair of conductive devices coupled in a flip/flop circuit configuration.

3. The circuit as defined in claim 2 wherein said conductive devices comprise MOSFETs.

4. The circuit as defined in claim 3 wherein a first of said MOSFETs has a source coupled to a ground conductor and a drain coupled to said source of operating power through a resistor, said drain coupled to ground through a capacitor having a predetermined value, said MOSFET further including a gate coupled to ground through a capacitor having a second predetermined value which is less than that of said first capacitor.

5. The circuit as defined in claim 4 wherein a second MOSFET has a source coupled to ground and a drain coupled to said source of operating power through a second resistor and a gate coupled to said drain of said first MOSFET through a third resistor, said gate coupled to ground through a third capacitor having a value greater than said second capacitor such that upon initial application of power to said MOSFETs, said first MOSFET will be rendered conductive.

6. The circuit as defined in claim 5 wherein said gate of said second MOSFET is coupled to said control terminal through a series combination of a resistor and a diode.

7. The circuit as defined in claim 6 wherein said control terminal is coupled to the junction of a resistor and a capacitor with the remaining terminal of said resistor coupled to said source of operating power and the remaining terminal of said capacitor coupled to ground.

8. A security circuit for a trainable transmitter comprising:
   a source of operating power; and
   a latch circuit coupled to said source of power and having a control terminal, said circuit latched in a first state when power is first applied to said circuit for providing a first logic level signal at said control terminal when in said first state, said circuit responsive to a signal applied to said control terminal by said trainable transmitter upon training to reverse the state of said latch in response to said signal at said control terminal for providing an enabling signal to a trainable transmitter as long as power is continuously applied to said latch.

9. The circuit as defined in claim 8 wherein said latch circuit includes a pair of conductive devices.

10. The circuit as defined in claim 9 wherein said conductive devices comprise MOSFETs.

11. The circuit as defined in claim 10 wherein a first of said MOSFETs has a source coupled to a ground conductor and a drain coupled to said source of operating power through a resistor, said drain coupled to ground through a capacitor having a predetermined value, said MOSFET further including a gate coupled to ground through a capacitor having a second predetermined value which is less than that of said first capacitor such that said first MOSFET is conductive when power is first applied to said circuit.

12. The circuit as defined in claim 11 wherein a second MOSFET has a source coupled to ground and a drain coupled to said source of operating power through a second resistor and a gate coupled to said drain of said first MOSFET through a third resistor, said gate coupled to ground through a third capacitor having a value greater than said second capacitor such that upon initial application of power to said MOSFETs, said first MOSFET will be rendered conductive and said second MOSFET will be non-conductive.

13. The circuit as defined in claim 12 wherein said gate of said second MOSFET is coupled to said control terminal through a series combination of a resistor and a diode.

14. The circuit as defined in claim 13 wherein said control terminal is coupled to the junction of a resistor and a capacitor with the remaining terminal of said resistor coupled to said source of operating power and the remaining terminal of said capacitor coupled to ground.

15. A trainable transmitter including a security circuit comprising:

a source of operating power;

said trainable transmitter coupled to said source; and said security circuit coupled to said source of power and to said trainable transmitter to enable the operation of said trainable transmitter once trained only if power from said source of operating power is not interrupted.

16. The trainable transmitter as defined in claim 15 wherein said security circuit comprises a latch circuit.

17. The trainable transmitter as defined in claim 16 wherein said latch circuit includes a pair of conductive devices coupled in a flip/flop circuit configuration.

18. The trainable transmitter as defined in claim 17 wherein said conductive devices comprise FETs.

19. The trainable transmitter as defined in claim 18 wherein a first of said FETs has a source coupled to a ground conductor and a drain coupled to said source of operating power through a resistor, said drain coupled to ground through a capacitor having a predetermined value, said FET further including a gate coupled to ground through a capacitor having a second predetermined value which is less than that of said first capacitor.

20. The trainable transmitter as defined in claim 19 wherein a second FET has a source coupled to ground and a drain coupled to said source of operating power through a second resistor and a gate coupled to said drain of said first FET through a third resistor, said gate coupled to ground through a third capacitor having a value greater than said second capacitor such that upon initial application of power to said FETs, said first FET will be rendered conductive.

21. The trainable transmitter as defined in claim 20 wherein said gate of said second FET is coupled to an enabling terminal of said trainable transmitter through a series combination of a resistor and a diode.

22. The trainable transmitter as defined in claim 21 wherein said enabling terminal is coupled to the junction of a resistor and a capacitor with the remaining terminal of said resistor coupled to said source of operating power and the remaining terminal of said capacitor coupled to ground.

* * * * *

UNITED STATES PATENT AND TRADEMARK OFFICE
CERTIFICATE OF CORRECTION

PATENT NO. : 5,940,000
DATED : August 17, 1999
INVENTOR(S) : Kurt A. Dykema

It is certified that error appears in the above-identified patent and that said Letters Patent is hereby corrected as shown below:

Column 3, lines 40 and 41;
    No paragraph.

Column 3, line 63;
    "said" should be --a--.

Column 3, line 66;
    "a" should be --said--.

Column 4, line 1;
    "a" should be --said--.

Column 4, line 56;
    "a" should be --said--.

Abstract, line 13;
    Delete "invention, the".

Signed and Sealed this

Fourteenth Day of March, 2000

Attest:

Q. TODD DICKINSON

Attesting Officer    Commissioner of Patents and Trademarks